United States Patent
Nelson

[15] 3,692,447
[45] Sept. 19, 1972

[54] MULTIPLE EXTRUSION APPARATUS
[72] Inventor: Alden W. Nelson, West Mystic, Conn.
[73] Assignee: Crompton & Knowles Corporation, Worcester, Mass.
[22] Filed: Nov. 30, 1970
[21] Appl. No.: 93,675

[52] U.S. Cl. .................425/113, 425/133, 264/174
[51] Int. Cl. .................................................B29f 3/10
[58] Field of Search ...........18/13 H, 135, 13 T, 14 P; 425/113, 131, 133; 264/174

[56] References Cited

UNITED STATES PATENTS

| | | |
|---|---|---|
| 3,222,721 | 12/1965 | Reynolds, Jr................18/13 P |
| 3,365,750 | 1/1968 | Donald........................18/13 P |
| 3,091,806 | 6/1963 | Kerr et al....................18/13 H |
| 1,100,002 | 6/1914 | Van Ness...................18 13 H/ |
| 2,732,588 | 1/1956 | Myers.........................18/13 H |
| 3,447,204 | 6/1969 | Lainson......................18/14 P |

Primary Examiner—Robert L. Spicer, Jr.
Attorney—Howard G. Garner, Jr.

[57] ABSTRACT

An extruding apparatus wherein a die-head containing dies for forming two or more layers of thermoplastic material, such as on a core passing through the head, is supplied with material by as many extruder barrels as there are layers. The barrels are connected to the die-head at different points, one of the barrels being fixed to the die-head and the other barrel or barrels being connected to the die-head by a connector which compensates for thermal expansion of the barrels and die-head. This connector has a telescoping component and a universal joint component to compensate for thermal expansion in any direction.

11 Claims, 6 Drawing Figures

FIG. I

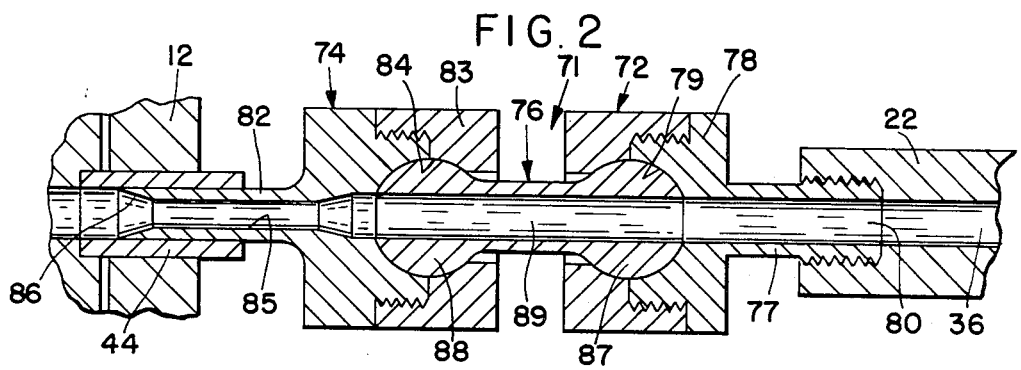
FIG. 2
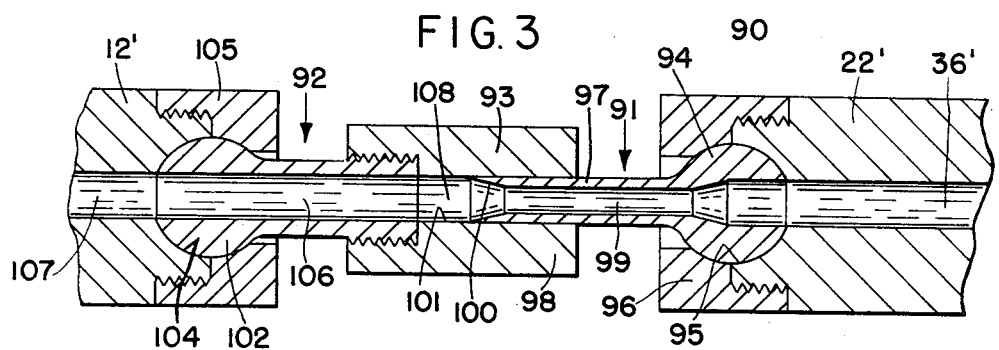
FIG. 3
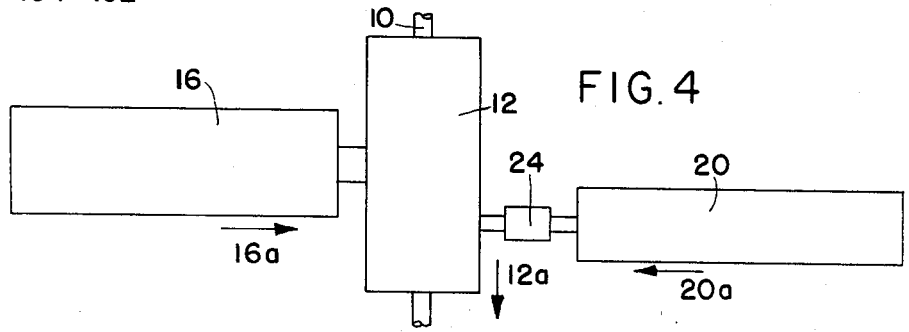
FIG. 4
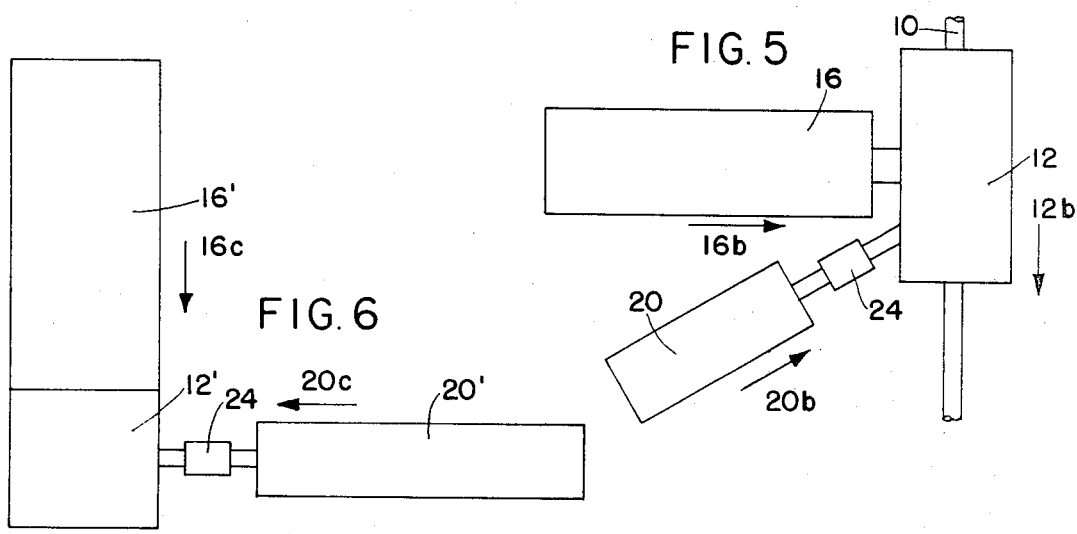
FIG. 5
FIG. 6

MULTIPLE EXTRUSION APPARATUS

BACKGROUND OF THE INVENTION

The present invention relates generally to apparatus for extruding multiple layers of plastic material for use in forming plastic tubing or covering a core such as an electrical wire. The invention relates more particularly to the manner in which the various extruder components such as extruder barrels and crosshead are arranged and interconnected to accommodate for thermal expansion of the components.

Thermal expansion has always been a factor to be considered in plastic extrusion machinery. The extent of expansion depends on the temperatures involved and the length of the extruder screw and barrel. With small lightweight extruders, the total expansion is not particularly bothersome. With single extruders, those in which a single layer of thermoplastic material is extruded directly from the barrel through a die affixed to the outlet end thereof, thermal expansion is not generally a problem. The inlet end is fixed and the outlet end containing the die moves with respect to a base. If the extruder is used for insulating a cable, the die or outlet end of the extruder barrel is aligned with the the cable when in the hot or expansive condition.

There are special extruder arrangements wherein it is desired to maintain the exit end of the barrel at a fixed location. One such arrangement is shown in U.S. Pat. No. 3,372,434 to J. W. Hendry. In this patent, an extruder barrel feeds material to a separate "material consuming device" via a conduit, one end of which is fixed thereto and the other end of which is connected to the extruder barrel by an axial "slip joint" which allows for axial expansion of the conduit without disturbing the relative spacing of the extruder barrel and "material consuming device." In the majority of cases, it is preferred to have the entrance end of the extruder barrel fixed. When two or more layers of thermoplastic material are formed within one material consuming device or die-head, a separate extruder barrel is employed for supplying material for each layer. If two layers are applied, one of the barrels has to be located at an angle to the extruding axis of the die-head. Arrangements of this type present a special thermal expansion problem which cannot be handled in the usual manner, since the thermal expansion of both extruder barrels has to be dealt with. Thermal expansion of the die head and extruder barrels may cause misalignments of the extruder barrels with respect to the die-head.

The problem of thermal expansion becomes particularly acute in apparatus for applying two layers of material on a core such as electrical wire. The wire or core is drawn through the die-head, which contains a die for each layer to be applied. The die-head for a wire insulating extrusion apparatus is generally referred to as a cross-head, and the insulating material is supplied from an extruder barrel for each layer. The barrels are connected to the cross-head at an angle to the longitudinal axis of the wire and at different points. If the barrels are located on opposite sides of the cross-head, their expansions are added, and since the barrels are connected to the cross-head at different points, the cross-head is caused to pivot about a point between these two points. This causes skewing or misalignment of the cross-head with respect to the longitudinal axis of the wire and also misalignment between the cross-head and each barrel.

If the barrels are connected to the same side of the die-head, expansion is in the same direction but the use of different size barrels, as is sometimes the case, would lead to a change in angle of the die-head along its longitudinal axis. In most cases, the size of the barrels would prevent them from being disposed parallel to each other on the same side of the die-head, creating additional deflection problems.

Whether both barrels are on the same side or one opposite sides of the die-head, thermal expansion of the die-head itself will change the distance between the points where the barrels are connected to the die-head, causing the barrels to bend or deflect. This condition may lead to breakage or leaking.

The same thermal expansion problems may exist with a straight die-head wherein the die-head is applied directly to the end of one extruder barrel which supplies material for a first layer and a second extruder barrel may be disposed at an angle to the die-head for supplying thermoplastic material for a second layer. With this arrangement, each barrel will be deflected by the thermal expansion of the other.

SUMMARY OF THE INVENTION

It is a principal object of the present invention to provide apparatus for extruding multiple layers of thermoplastic material without any of the above-described problems associated with thermal expansion.

The principal object of the invention is accomplished by apparatus in which a cross-head is fixed to one of the extruder barrels and attached to the other barrel through expansion compensating means in which expansion of the barrels along their longitudinal axes is accommodated by allowing the entrance end of the other barrel to move longitudinally or, preferably, to employ a telescoping connection between the barrel and the cross-head. This telescoping connection also utilizes two universal joints to accommodate thermal expansion of the cross-head. Expansion of all components can be compensated for by this last described connection between one of the barrels and the cross-head. By maintaining both barrels stationary, at least with respect to their entrance ends, expansion of the barrel which is fixed to the cross-head will cause the cross-head to move relative to the longitudinal axis of the core. In this case, the apparatus is adjusted or set up so that the cross-head and the core are in the proper relationship while the apparatus is in the "hot" or operating condition.

It is also possible to arrange one of the extruder barrels so that its longitudinal axis is parallel with that of the cross-head and is connected to the cross-head by the previously described thermal expansion compensating means. This extruder barrel and the cross-head may be disposed so that the longitudinal expansion of the cross-head will subtract from that of the barrel but, since the extruder barrel is longer than the cross-head, the barrel will expand more and the difference in expansion between it and the cross-head will be accommodated by the two universal joints which form part of the connector.

BRIEF DESCRIPTION OF THE DRAWINGS

The invention will be better understood from a reading of the following description in conjunction with the accompanying drawings in which:

FIG. 2 is a section of a first modification of the thermal expansion compensating means;

FIG. 3 is a section similar to FIG. 2 showing a second modification of the thermal expansion compensating means; and FIGS. 4–6 are diagrammatic views illustrating the invention as applied to different extruder arrangements.

DETAILED DESCRIPTION OF THE PREFERRED EMBODIMENT

Figure 1:
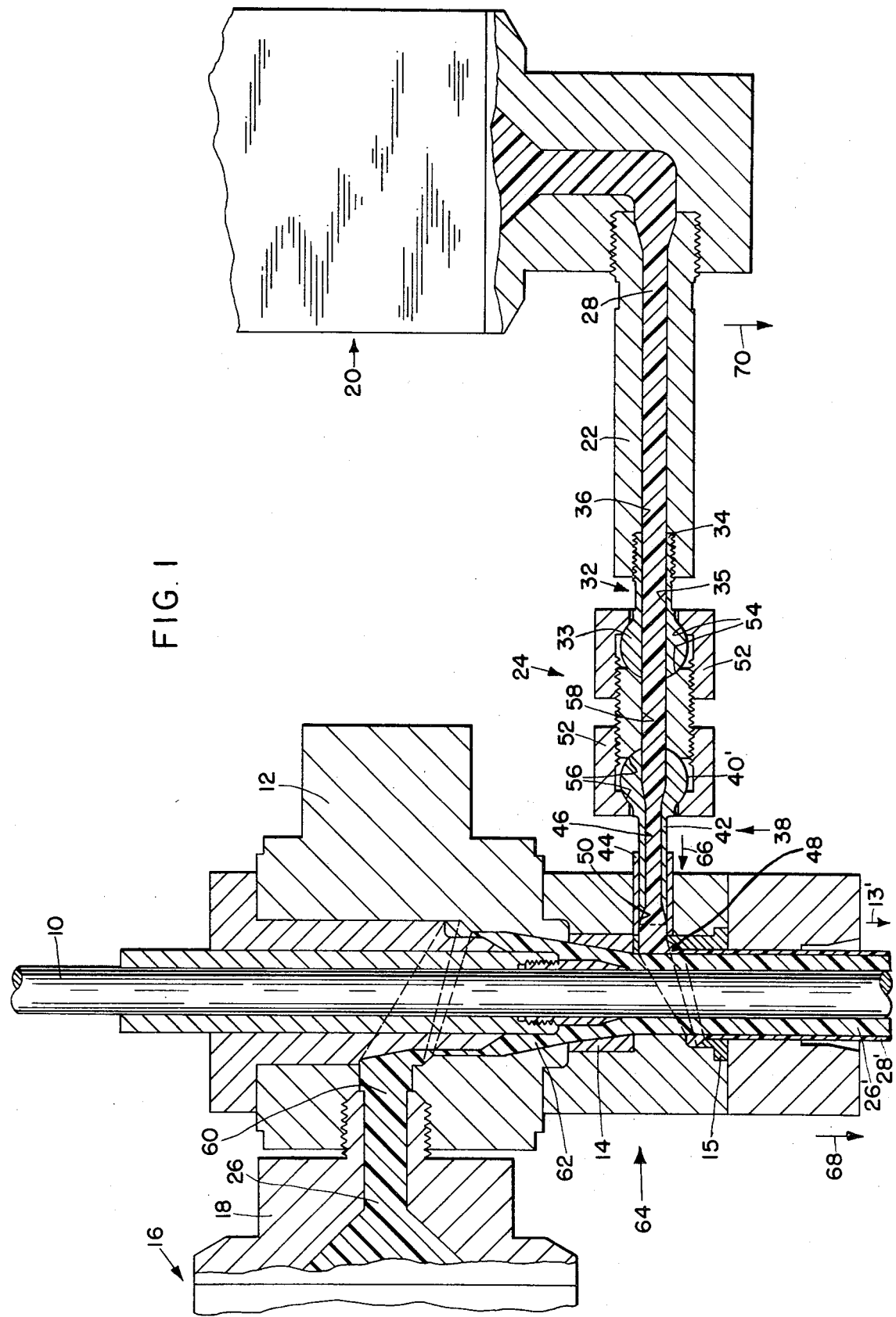
FIG. 1 is a plan view of the invention, major portions of which are in section.

Referring to FIG. 1, the preferred form of the invention is shown as applied to an extruder set-up for applying two layers of thermoplastic material to a core. The core is indicated at 10 and passes through a cross-head 12, in the direction of arrow 13, within which are located first and second dies 14 and 15 for forming first and second layers, respectively. The dies themselves need not be of any particular type of construction and may be of any type well known in the art.

The first extruder barrel, generally indicated at 16, has an outlet end 18 which is rigidly attached to cross-head 12 so that it supports same. A second extruder barrel, generally indicated at 20, has an outlet end 22 which is attached to cross-head 12 through thermal expansion compensating means generally indicated at 24.

The second extruder barrel 20 is shown in FIG. 1 with its longitudinal axis parallel to the longitudinal axis of the cross-head, but it may be arranged so that its longitudinal axis was at a right angle to the longitudinal axis of the cross-head or at any angle with respect to the cross-head.

Thermoplastic material, indicated at 26, is introduced from the first extruder into the cross-head at a first point in the cross-head which is upstream of the direction of travel of the core 10. Thermoplastic material, indicated at 28, from the second extruder is introduced into the cross-head at a point in the cross-head which is downstream of the first point with respect to the direction of core travel.

Expansion compensating means 24 includes a first connector generally indicated at 32 which has a ball-shaped portion 33 and an elongated portion 34 which is fixed to the end 28 of barrel 20. Connector 32 also has a bore 35 which extends completely through the connector and which communicates with a bore 36 in end 28. Means 24 also includes a second connector generally indicated at 38 which has a ball-shaped portion 40 and an elongated portion 42 which is slidable within a sleeve 44 in cross-head 12. Connector 38 has a bore 46 extending completely therethrough which communicates with a die passage 48 via sleeve 44. The end of portion 42 which extends into sleeve 44 has an inside bevel 50 which forms a thin deflectable wall at the very end thereof to effect a seal against the inside wall of sleeve 44 by pressure from within bore 46. Portion 42 thereby forms a telescoping connection with sleeve 44 and yet by virtue of bevel 50 maintains a sealed relationship therewith. Compensating means 24 also includes a coupling assembly 52 fashioned as a unit, as shown in FIG. 1 to form sockets 54 and 56 at opposite ends thereof for receiving ball-shaped portions 33 and 40, respectively. Coupling member 52 has bore 58 which communicates with bores 35 and 46.

In operation, thermoplastic material 26 is extruded from an outlet opening 60 of end 18 into a die passageway 62 in cross-head 12 to form a first layer 26' on core 10. Thermoplastic material 28 is extruded from bore 36 in end 22 through bores 35, 58 and 46 and into die passageway 48 to form a second layer 28' over layer 26'. During operation, all of the elements shown are heated by heaters, not shown, to maintain the thermoplastic material in a fluid condition. Thermal expansion of barrel 16 has the effect of moving cross-head 12 in the direction of arrow 64 and thermal expansion of outlet end 22 together with expansion of compensating means 24, although slight, has the effect of moving portion 42 of connector 38 in the direction of arrow 66, which is in the opposite direction of arrow 64. Both of the motions indicated by arrows 64 and 66 are compensated for by the sliding of end 42 within sleeve 44. If the longitudinal axis of barrel 20 were disposed at a right angle to the longitudinal axis of the cross-head, as shown in FIG. 4, the motion in the direction of arrow 66 would be greater but would still be accommodated by the sliding of portion 42 within sleeve 44. Thermal expansion of the cross-head along its longitudinal axis causes the downstream end thereof to move in the direction of arrow 68 since the cross-head is fixed to extruder barrel 16 at its upstream end. Thermal expansion of barrel 20 will cause the outlet end thereof to move in the direction of arrow 70, which is in the same direction as arrow 68. Since barrel 20 is longer than the cross-head, the resulting expansion thereof is greater than for the cross-head and the difference is compensated for by a clockwise rotation, as viewed in FIG. 1, of coupling member 52 around ball-shaped portions 33 and 40.

If the longitudinal axis of barrel 20 were disposed at a right angle to the cross-head, the thermal expansion of the cross-head along its longitudinal axis would be compensated for by a counter-clockwise rotation, as viewed in FIG. 1, of compensating means 24 around ball-shaped portions 33 and 40. In fact, the barrel 20 could be disposed in any angle with respect to the cross-head and the effect of its thermal expansion will be accommodated by expansion compensating means 24. If cross-heads having die means for forming more than two layers are used, additional extruder barrels may be attached to the cross-head by compensating means such as 24.

As shown in FIG. 4, an arrangement is shown wherein the barrels 16 and 20 are arranged on opposite sides of the cross-head and at right angles thereto. Expansion of the barrels 16 and 20 and the cross-head 12 is in the direction of the arrows 16a, and 20a and 12, respectively. Compensating means 24 accommodates thermal expansion of both barrels in the direction of arrows 16a and 20a by sliding into cross-head 12 and expansion of the cross-head in the direction of arrow 12a through its universal joint.

FIG. 5 illustrates an arrangement wherein both barrels are connected to the same side of the cross-head but at different angles thereto because of spacing problems. Expansion of the barrels 16 and 20 and cross-head 12 are indicated by the arrows 16b, 20b and 12b, respectively, and it can be seen that a portion of the expansion of barrel 20 will be in the direction of expansion of barrel 16. Compensating means 24 will accommodate any difference in expansion between the two barrels in the direction of arrow 16b. The remaining component of motion due to expansion of barrel 20 will be in a direction opposite to that of arrow 12b which would tend to cause greater misalignment than would be expected from the expansion of cross-head 12 alone. Compensating means 24 will pivot in a manner previously described to accommodate for this misalignment.

FIG. 6 illustrates an arrangement wherein the die-head is a straight-head indicated at 12' and attached directly to the end of a first extruder barrel indicated at 16'. Straight-head 12' contains a die for forming a first layer from thermoplastic material supplied from barrel 16' and die for forming a second layer from thermoplastic material supplied from a second extruder barrel indicated at 20' and attached to straight-head 12' by a compensating means 24' which is identical to previously described means 24. Expansion of barrel 20' will be in the direction of arrow 20c and will be compensated for by the sliding of means 24' within head 12'. Expansion of barrel 16' in the direction of arrow 16c will be accommodated by the universal point portion of means 24'.

DESCRIPTION OF FIRST MODIFICATION

A modified expansion compensating means, generally indicated at 71, is shown in FIG. 2. Means 71 includes a first connector 72, a second connector 74 and a coupling member 76. Connector 72 also has a bore 80 which extends therethrough and communicates with bore 36 in end 22. Connector 74 has an elongated portion 82 which is similar to portion 42 and extends into sleeve 44 to form a telescoping connection therewith. Connector 74 also has an enlarged portion 83 which contains a socket 84, part of which is formed by a holding ring 81', and a bore 85 which extends therethrough. The end of portion 82 terminates within sleeve 44 and has an inner bevel 86 which is similar to bevel 50 for effecting a seal with sleeve 44.

Each end of coupling member 76 has a ball-shaped portion indicated at 87 and 88 which fit into sockets 79 and 84, respectively. Coupling member 76 also has a bore 89 extending therethrough which communicates with bores 80 and 85, as shown in FIG. 2. Compensating means 71 functions in a manner similar to compensating means 24 by allowing for relative motion of end 22 of barrel 20 and cross-head 12 due to thermal expansion.

DESCRIPTION OF SECOND MODIFICATION

Referring to FIG. 3, a second modification of an expansion compensating means is indicated generally at 90 which includes a first connector 91, a second connector 92 and a coupling member 93. Connector 91 has a ball-shaped portion 94 at one end thereof which fits into a socket 95 formed in the end 22' of the second extruder barrel 20. End 22' is similar to end 22 except for the socket 95, part of which is formed by a holding ring 96 which is screwed onto the end of 22'. The other end of connector 91 has an elongated portion 97 which is slidable within a sleeve-like portion 98 of coupling member 93 to form a telescoping relationship therewith. A bore 99 extends through connector 91 and is connected to a bore 36' in outlet end 22'. The end of elongated portion 97 terminates within sleeve-like portion 98 and has an inner bevel 100 which is similar to bevel 50 for forming a seal against the inner wall of portion 98.

Connector 92 has a ball-shaped portion 102 at one end thereof which fits into a socket 104 in cross-head 12' which is similar to cross-head 12 except for the manner in which the compensating means is connected thereto. A ring 105 similar to 96 forms part of socket 104. The other end of connector 92 is threaded into coupling member 93 and has a bore 106 which communicates with an opening 107 into cross-head 12' and a bore 108 in coupling member 93 which is defined by inner wall 101. Thermoplastic material is extruded from bore 36' through bores 99, 108 and 106 into opening 107 in cross-head 12'. Ball and socket combinations 102,104 and 94,95 form pivoted joints for expansion compensating means 90 with cross-head 12' and end 22', respectively. These pivoted joints together with the telescoping connection of 97 and 93 allow for relative change in position of the cross-head and end 22' of the extruder barrel from thermal expansion thereof.

Having described the invention, what is now claimed is:

1. Apparatus for extruding multiple layers of a thermoplastic material comprising:
    a. a die-head having dies for forming each of said layers;
    b. a first extruder barrel fixed to said die-head for supplying thermoplastic material to said die-head at a first point;
    c. a second extruder barrel for supplying thermoplastic material to said die-head at a second point; and
    d. thermal expansion compensating means connecting said second extruder barrel to said die-head to permit expansion along the longitudinal axis of said die-head.

2. The apparatus as described in claim 1 wherein said thermal expansion compensating means comprises:
    a. a first connector connected to said second extruder barrel;
    b. a second connector telescopically mounted to said die-head; and
    c. a coupling member pivotally connected at one end to said first connector and at its other end to said second connector.

3. The apparatus as described in claim 2 wherein said telescopic connection comprises a sleeve and an inner tubular member arranged in a close sliding fit within said sleeve and terminating therein, the terminating end of said inner member being beveled on the inside for outward deflection from pressure within said inner tubular member and for forming a pressure seal against the inner surface of said sleeve.

4. The apparatus as described in claim 2 wherein the pivotal connections for said coupling member are ball and socket joints.

5. The apparatus as described in claim 4 wherein each of said ball and socket joints comprise a ball on the connector and a socket for said ball in said coupling member.

6. The apparatus as described in claim 4 wherein each of said ball and socket joints comprise a socket within the connector and a ball on said coupling member for said socket.

7. The apparatus as described in claim 1 wherein said expansion compensating means comprises:
   a. a first connector, one end of which is pivotally mounted to said second extruder barrel;
   b. a second connector, one end of which is pivotally mounted to said die-head; and
   c. a coupling member coupling the other ends of said first and second connectors and being telescopically connected to at least one of said connectors.

8. The apparatus as described in claim 7 wherein the pivotal connections of said first and second connectors are ball joints.

9. The apparatus as described in claim 7 wherein said telescopic connection comprises a sleeve and an inner tubular member arranged in a close sliding fit within said sleeve and terminating therein, the terminating end of said inner member being beveled on the inside for outward deflection from pressure within said inner tubular member and for forming a pressure seal against the inner surface of said sleeve.

10. The apparatus as described in claim 1 wherein said first and second extruder barrels are on opposite sides of said die-head.

11. The apparatus as described in claim 10 wherein said cross-head is adapted to receive a continuous core and for depositing said layers of thermoplastic material on said core and wherein the innermost layer on said core is formed from material supplied from said first extruder barrel.

* * * * *